July 29, 1930.    J. M. SCHOONMAKER, JR    1,771,736
BUMPER
Filed March 5, 1929
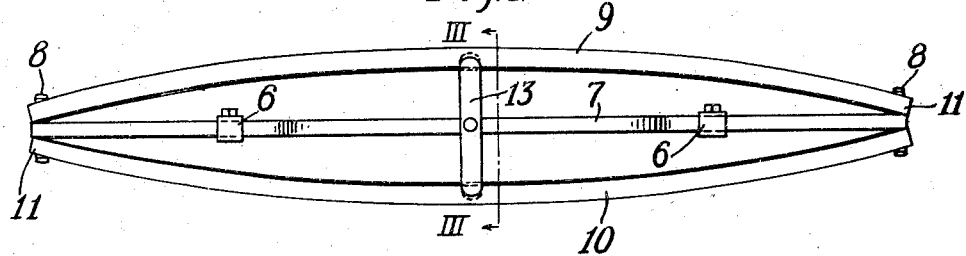
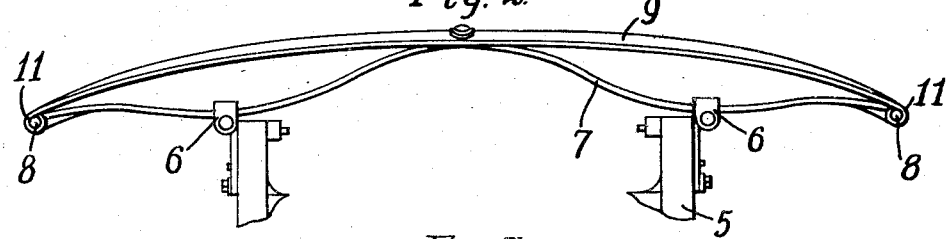
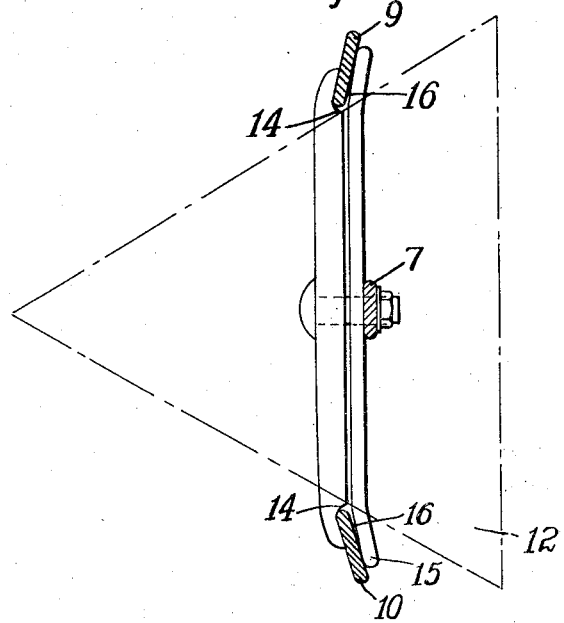
INVENTOR
James M. Schoonmaker, Jr.
By Green & McCallister
His Attorneys Patented July 29, 1930

1,771,736

UNITED STATES PATENT OFFICE

JAMES M. SCHOONMAKER, JR., OF SEWICKLEY, PENNSYLVANIA, ASSIGNOR TO STANDARD STEEL SPRING COMPANY, A CORPORATION OF PENNSYLVANIA

BUMPER

Application filed March 5, 1929. Serial No. 344,370.

This invention relates to bumpers and more particularly to vehicle bumpers such as are commonly employed for protecting the ends of motor cars.

Bumpers of this type as generally constructed include a pair of substantially parallel bars so as to form a number of parallel lines extending across the car which tends to give a wide squatty appearance thereto. In order to interrupt the continuity of these parallel lines and to eliminate this appearance, bumpers are sometimes formed with curves or angular bends in the horizontal line, but as heretofore constructed, such arrangements have required the edge bending of one or more of the bumper bars. This forming process, known as edge bending, is a costly operation and materially increases the expense of manufacture.

An object of this invention is to provide a bumper of the type set forth constructed and arranged to eliminate the effect of parallel lines without the necessity of edge bending either of the bumper bars.

A further object is to provide a vehicle bumper of this type, the cost of manufacture of which will be no greater than the cost of standard straight bar bumpers.

These and other objects which will be apparent to those skilled in this particular art are accomplished by means of the invention illustrated in the accompanying drawings in which Fig. 1 is a view in elevation of a bumper constructed in accordance with one embodiment of this invention. Fig. 2 is a top plan view thereof and Fig. 3 is a transverse sectional view on the line 3—3 of Fig. 1.

In the particular embodiment of the present invention which has been chosen for the purposes of illustration, the bumper is shown mounted on the front of the frame 5 of a suitable vehicle (not shown) by means of clips 6 supporting a standard bumper support bar 7 of resilient construction and having bumper bar supporting pins 8 extending through each end thereof.

Upper and lower bumper bars 9 and 10, respectively, have eyes 11 in the ends thereof for loosely engaging the pins 8 above and below the support bar 7 and the pins are either headed over, or any desired form of retaining means well known to the art, may be employed for preventing the eyes 11 from slipping off the supporting pins. After the bumper bars 9 and 10 are located on the pins 8, a wedge 12, indicated in dotted lines in Fig. 3, is driven between them centrally thereof so as to bow each bar outwardly at its center portion in the manner indicated in Fig. 1. A spreader plate 13, having bar supporting shoulders 14, is positioned between the spread apart bars and a clamping plate 15 is bolted thereto so as to retain the bars on the supporting shoulders of the spreader plate to form, in effect, bar receiving slots 16 in which the bowed bumper bars are received.

The spreading of the bumper bars causes the eyes in the ends thereof to bind on the supporting pins 8 and the bars are flexed or sprung out of their normal horizontal plane as shown in Fig. 1 and also out of the vertical plane as shown in Fig. 2. It will, of course, be understood that the eyes 11 do not in actual operation fit the pins 8 as loosely as is indicated in the drawings, this feature being somewhat exaggerated for the purposes of illustration. The resilience of the bumper bars causes them to press together against the spreader shoulders 14 and also engage the pins 8 so that the whole structure is securely held together in a tight assembly. The spreader mechanism including plate 13 and clamping plate 15 are bolted to the support bar 7 in the usual way.

It will be apparent that the spreading of the bars 9 and 10, not only gives a considerably wider bumping surface, but eliminates the parallel lines of the standard bumper construction without having to subject the bumper bars to expensive edge bending operations.

What I claim as new and desire to secure by Letters Patent is:

1. A vehicle bumper including a pair of bumper bars of increasing vertical inclination from a minimum inclination at the ends of the bars to a maximum inclination at the central points thereof.

2. A vehicle bumper including a pair of bumper bars of increasing vertical inclination from a minimum inclination at the ends of the bars to a maximum inclination at the central points thereof, said bars also being spread apart gradually from their ends, which are closely adjacent, to their central points which are subject to the maximum spread.

3. A vehicle bumper including a pair of bumper bars, substantially the complete bars being increasingly inclined from the vertical from the ends thereof to the central points, the extreme ends being substantially vertical.

4. A vehicle bumper including a pair of bumper bars of increasing vertical inclination from a minimum inclination at the ends of the bars to a maximum inclination at the central points thereof, said bars also being spread apart gradually from their ends, which are closely adjacent, to their central points which are subject to the maximum spread, and a spreader plate maintaining said bars in said positions.

5. A vehicle bumper including a pair of bumper bars, substantially the complete bars being increasingly inclined from the vertical from the ends thereof to the central points, the extreme ends being substantially vertical, and a central spreader plate having a portion at each end at the same inclination as the central points of said bars, thereby maintaining said bars in said positions.

In testimony whereof, I have hereunto subscribed my name this 2nd day of March, 1929.

JAMES M. SCHOONMAKER, Jr.